United States Patent Office 3,232,842
Patented Feb. 1, 1966

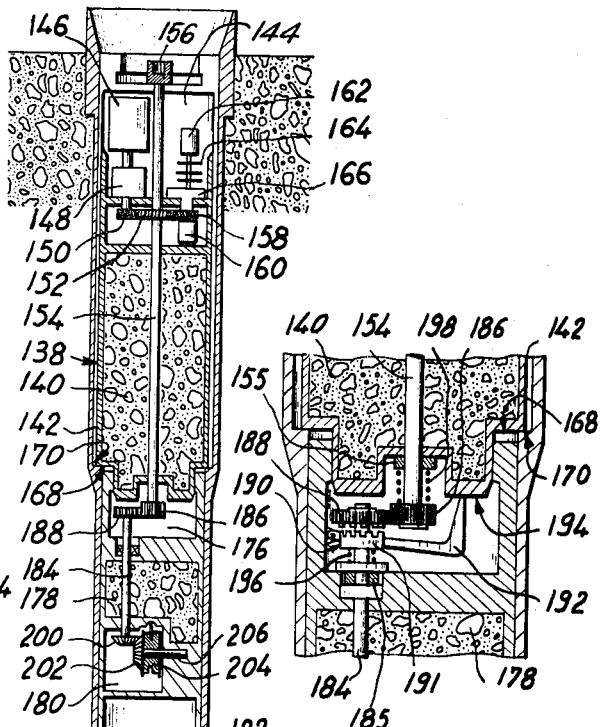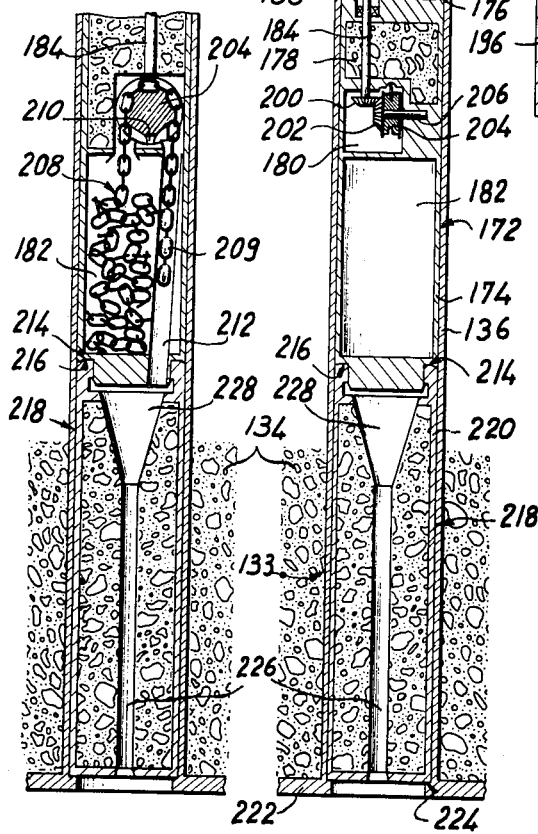

3,232,842
DEFORMABLE METAL CHAIN DEVICE FOR REGULATING THE POWER OF A REACTOR
Didier Costes, Paris, and Jacques Lebey, Viroflay, France, assignors to Commissariat a l'Energie Atomique, Paris, France
Filed June 16, 1964, Ser. No. 375,487
Claims priority, application France, June 25, 1963, 939,251; Oct. 30, 1963, 952,351
6 Claims. (Cl. 176—36)

The present invention relates to a device for regulating the power of a reactor by acting on the reactivity of the reactor core.

It is known that the power of a nuclear reactor is generally regulated by means of elements having a high absorbing power with respect to the neutrons, and these elements are introduced to a greater or less depth into the core or active portion of the reactor. In most cases, these elements are in the form of rigid cylindrical rods which are capable of longitudinal displacement in channels provided for this purpose. Their bulk in the sense of length, when they are entirely withdrawn from the core, is thus of the same order of magnitude as that of the core. If the controls rods and/or their control mechanisms emerge from the biological protection of the core, they require special protection, and their presence can also hinder the manipulations and working of the loading apparatus; for this reason, it is sometimes necessary for the rods and their mechanisms to leave the charging face completely free. As a result, the thickness of the biological protection, or the distance between the latter and the core, has to be increased.

Various solutions have already been proposed for reducing this bulk in the longitudinal sense and eliminating the aforesaid consequences: for example, telescopic rods, folding rods, plates arranged like a string of beads capable of being wound up etc. Unfortunately, although these solutions are advantageous as regards the reduction of the longitudinal bulk of the rods, they are in most cases disadvantageous as regards transverse bulk (sometimes this can be as much of a hindrance), or the simplicity of the control mechanisms or the effectiveness of the general assembly (excessively small absorbing surfaces).

The present invention has as its object to provide a device for the regulation of the power of a nuclear reactor whereby these aforesaid disadvantages can be obviated, by means of inconsiderable bulk and a particularly simple and uncomplicated construction.

According to the invention there is provided a device for regulating the power of a nuclear reactor, of the type comprising a neutron absorbing element, for example, at least one deformable metal chain, and means for displacing the said element within a vertical channel extending through the reactor core, between a "withdrawn" position in which it is entirely outside the core and a "deployed" position in which it occupies substantially the entire height of the said core, characterised in that the said element is arranged in the withdrawn position within a detachable container situated in alignment with the aforesaid channel.

In one embodiment of the invention the detachable container is situated at the lower portion of the channel below the core of the reactor, the neutron absorbing element being preferably constituted by a plurality of chains made for example of rustproof steel. The chains are arranged side by side and are connected to an attaching member which itself is fixed at one of its ends to a hoisting cable, the said displacing means comprising a winch situated above the said channel for winding the said cable.

In another embodiment of the invention the removable container is arranged above the said channel, and the neutron absorbing element is constituted by a single link-type chain, the links co-operating with a driving sprocket wheel situated above the said container.

Referring now to the accompanying diagrammatic drawings a description will be given, by way of example, that two embodiments of the device for regulating the power of a nuclear reactor and which correspond respectively to the two embodiments mentioned above. The constructional arrangements described with reference to these embodiments are applied more particularly to a vertical-axis reactor with solid moderator (graphite), cooled by a gas under pressure (carbon dioxide), the core and the fuel loading apparatus of which are arranged within one and the same sealing-tight concrete shield and separated by a protection slab from radiation (loading arrangement of the "garret" type). It will be apparent that the invention is applicable also to other types of reactors, more particularly having a liquid moderator and/or refrigerant, having a metal shield, conventional loading installations, etc.

In the accompanying drawings:

FIGURE 5 is a longitudinal sectional view showing another variant of the regulating device;

FIGURE 6 is a detail view of the device shown in FIGURE 5;

FIGURE 7 is another detail view shown on a larger scale.

Figure 1:
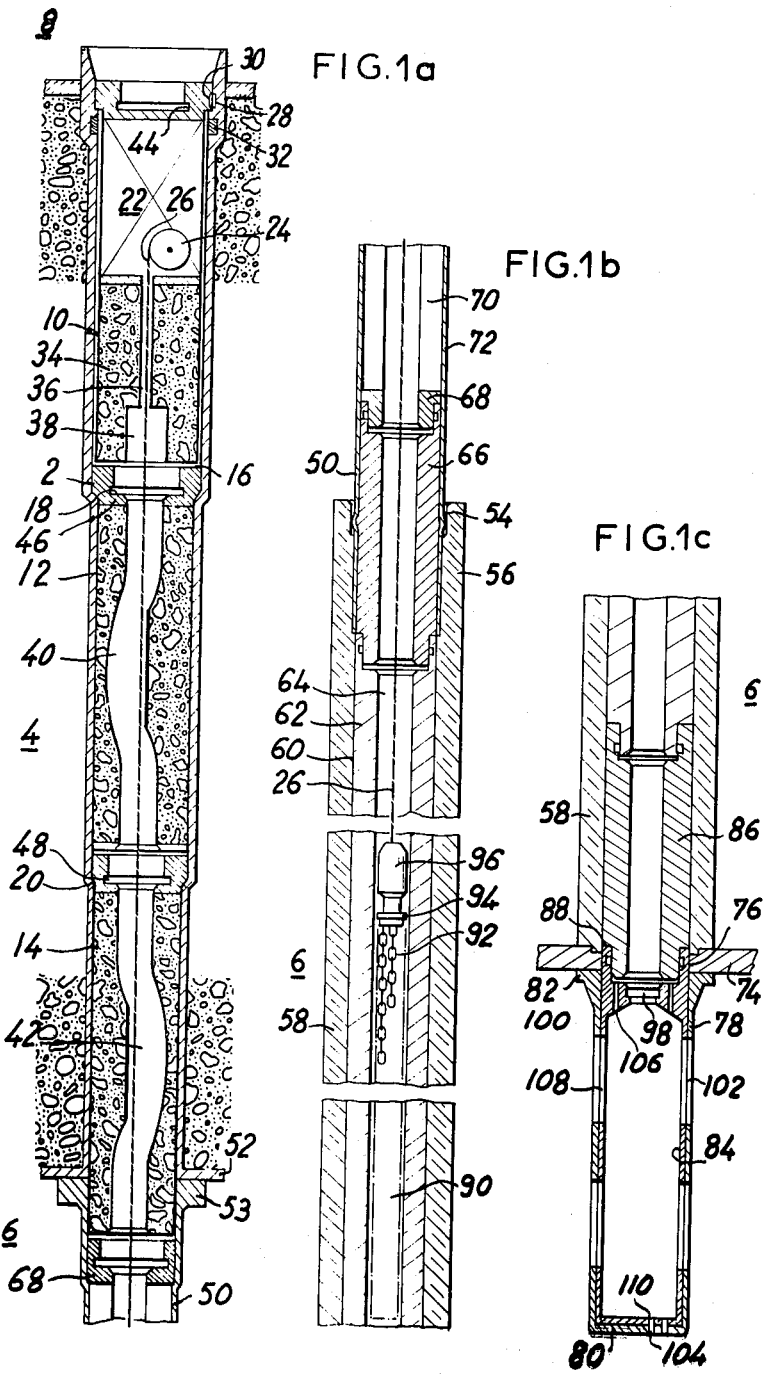
FIGURES 1a, 1b and 1c show diagrammatically in longitudinal section a regulating device constructed according to the invention.

The device shown in FIGURES 1a, 1b and 1c is situated in the reactor in the following manner:

The upper portion (FIGURE 1a) which comprises essentially the control mechanism of the device and the protection thereof, is entirely located in a partition slab between the reactor core region and the region of the loading garret, these two regions being respectively indicated by the references 8 and 6.

The central portion (FIGURE 1b) which comprises essentially a moderator column 58 perforated with an axial channel for the passage of the absorbing chains, extends over the entire height of the core.

The lower portion (FIGURE 1c) which comprises essentially a housing 84 intended to receive all or part of the absorbing chains and which is situated below a floor 74 supporting the core.

The upper portion of the device is located in a vertical cylindrical orifice extending through the partition slab 4 between the core 6 and the reactor garret 8. It is composed of three cylindrical plugs 10, 12 and 14 of slightly different diameters (diminishing in a downward direction), situated one above the other in the orifice 2 and bearing respectively on the shoulders 16, 18 and 20 of the inner wall of the said orifice. These plugs are constituted generally by a metal envelope in which concrete is cast.

The plug 10 comprises at its upper portion a recess 22 receiving the control mechanism proper; the latter comprises a winch 24 on which is wound a steel cable 26 intended for the handling of the absorbing element.

The winch 24 is driven by an electric motor (not shown in the drawings) which is also mounted in the recess 22, supply to this motor being effected by way of studs such as 28 and 30 situated respectively on the walls of the upper portion of the plug 10 and in the inner wall of the orifice 2. Automatic contact between these studs when the plug is placed in position can be obtained by providing on the outer surface of the said plug a system of oblique ramps (not shown in the drawings); these ramps co-operate with six shoes such as 32 carried by the inner wall of the orifice 2, thus giving the plug the appropriate angular orientation.

The solid portion 34 of the plug 10, situated below the winch 24, comprises along its axis a channel of small diameter 36 to permit the free passage of the cable 26; the winch 24 is arranged and designed so that the hanging end of the cable is constantly in line with the channel 36. The plug 10 also comprises at its lower portion a cylindrical housing 38, co-axial with the channel 36, intended for receiving in certain cases a handling member which will be discussed hereinafter.

The plug 12 comprises simply an elbowed channel 40, having the same cross-section as the housing 38, and centered at its ends on the axis of the plug, to permit the passage of the aforesaid handling member.

The plug 14 is identical (except for external diameter) with the plug 12 and therefore also comprises an elbowed channel 42.

The channels 40 and 42 have been made elbowed in order to reduce to the minimum the long straight paths which can promote leakages of radiation towards the garret; however, these channels are such that the cable 26 can run freely along the axis of the orifice 2 whatever the relative angular setting of the plugs 12 and 14 relatively to one another.

The plugs 10, 12 and 14 comprise respectively at their upper portion inner recesses provided with grooves 44, 46 and 48 to permit their handling by a suitable tongs operated from a loading machine (not shown).

The plug 14 is prolonged slightly below the slab 4, and enters a guide tube 50 the upper portion of which is fixed to the metal framework 52 of the said slab by means of a strap 53 and the lower portion of which fits into a bore 54 in the end rod 56 of a moderator column 58 (FIGURE 1b). The column 58 comprises a central channel 60 in which are stacked casings such as 62 forming a new channel 64 of smaller diameter than 60. Perfect continuity between the channel 64 and the channel 42 (which are of the same cross-section) is ensured by means of a first casing 66 co-operating both with the rod 56 and the guide tube 50, and a second casing 68 resting on the first and extending in the guide tube as far as the lower portion of the plug 14. The casing 68 and also the guide tube 50 comprise apertures such as 70 and 72 to permit the refrigerant gas to enter (when flow is in the downward direction) into the channel 64.

The moderator column 58 rests at its lower portion (FIGURE 1c) on the floor 74 which supports the stack assembly. This floor 74 comprises a hole 76 of the same diameter as the channel 60, and the latter is extended below the floor by a cylindrical case 78 provided with a bottom portion 80. This case 78, which is fixed at its upper portion by a flange 82 to the floor 74, receives a cylindrical container 84 of the same diameter as the casings 62 and which rests on the bottom portion 80 of the case 78. The casing 86 situated at the lower portion of the column 58 rests on the bearing surface 88 of the container 84.

The absorbing element provided in the regulating device in question is shown diagrammatically (external contours in dot-dash lines) under the reference 90 in FIGURE 1b. This element 90 is in the form of a plurality of identical chains such as 92, of the type known as "hoisting chains," which are arranged side by side and are fixed at one of their ends to a head 94. The head 94 is itself suspended on the cable length 26 by means of the gripping member 96.

The use of an absorbing element in such a form makes it possible to obtain, with an equal amount of bulk within the core, a greater absorption capacity than that of conventional cylindrical rods. Taking this increased capacity into consideration, it is possible in some cases to make these chains of a material which does not have a very high specific absorption power relatively to the neutrons ("grey" body) such as rustproof steel, or steel containing a slight amount of boron.

In the position shown in FIGURE 1b, the anti-reactivity power introduced into the core by the elements 90 is of course at the maximum, since the element occupies substantially the entire height of the active portion. In order to reduce this anti-reactivity power, the drive of the winch 24 is acted upon to unwind the cable 26 until at least a portion of the element 90 as entered the lower container 84. The said power can be reduced to a value near to zero by continuing the unwinding of the cable 26 until the head 94 comes into the vicinity of the aperture 98 provided in the upper portion 100 of the container 84. At this moment, the chains 92 which constitute the element 90 are folded on themselves within the container 84 and are then entirely contained in the said container. As FIGURE 1c shows, the case 78 is provided with apertures such as 102 and 104, and the container 84 with apertures such as 106, 108 and 110 to permit the refrigerant gas to flow in all circumstances to the channel 64 and the container itself, thus ensuring constant cooling of the element 90.

An essential advantage of using chains in accordance with the arrangement proposed hereinbefore will be apparent here. Indeed, in addition to the possibility of storing the "inactive" portion of the absorbing element in the lower portion of the reactor in a relatively small space, this "lower-end" storage does not require at the upper portion of the device anything more than the bulk due to winding a cable of small diameter 26 on a winch 24.

Figure 2:
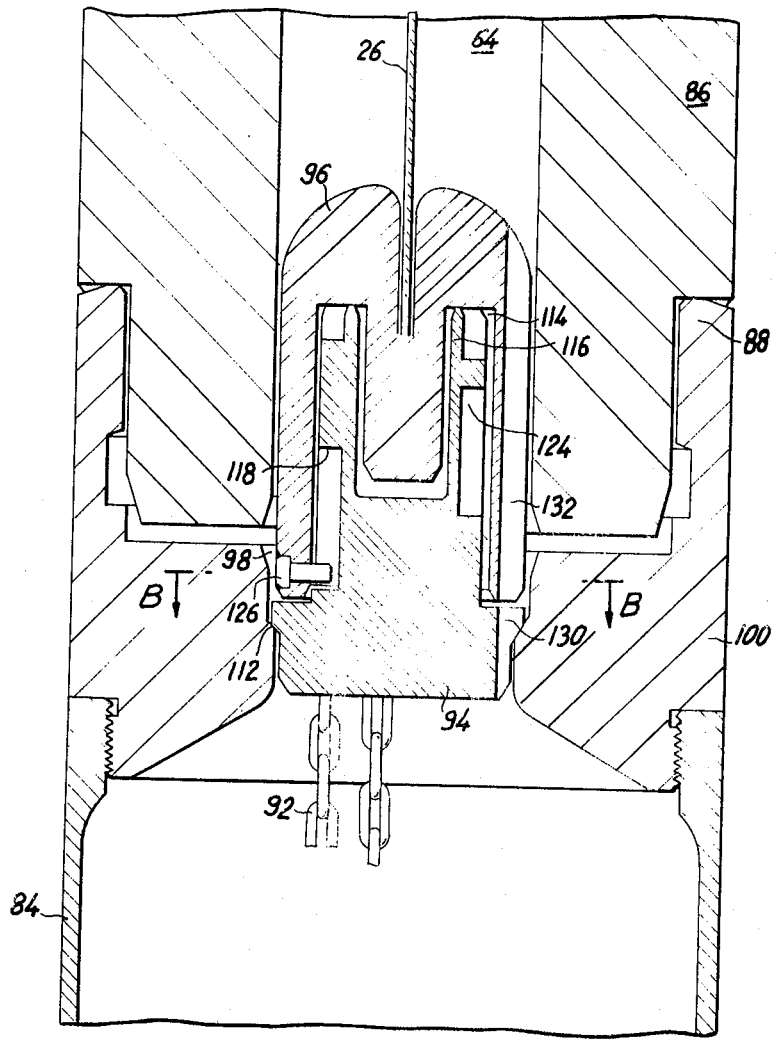
FIGURE 2 shows diagrammatically, in longitudinal sectional view taken on the line AA of FIGURE 3, a system for attaching neutron absorbing chains to their hoisting cable.
Figure 3:
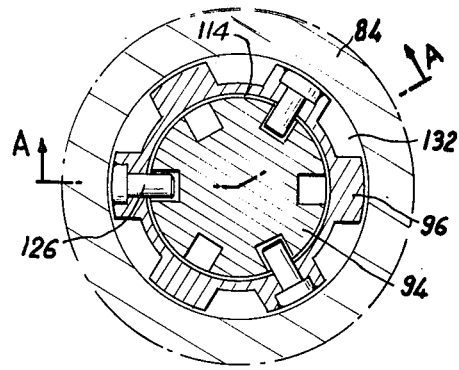
FIGURE 3 is a sectional view on the line BB of FIGURE 2.
Figure 4:
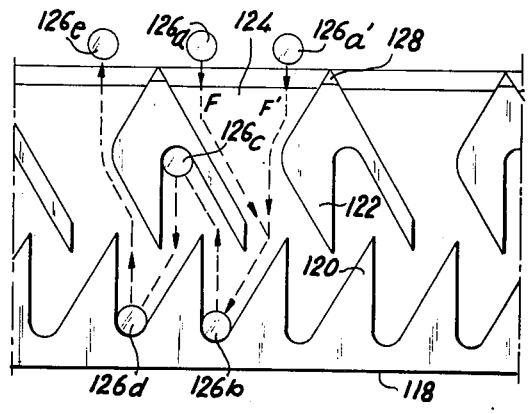
FIGURE 4 is a developed view of a cam which forms part of the construction of the system shown in FIGURE 2.

In order to facilitate the operations of positioning and unloading all or part of the device (operations which will be described hereinafter), the head 94 of the element 90 and the gripping member 96 comprise a gravity-operated attaching system the constructional details of which are shown in FIGURES 2, 3 and 4.

FIGURE 2 shows a sectional view through an assembly constituted by the member 96 and the head 94, the latter bearing against an inner shoulder 112 provided in the aperture 98 of the container 84. In this position, the chains 92 are entirely contained in this container. The member 96 which is fixed on the end of the cable 26 by any suitable means not shown in the drawings, is in the general form of a vertical cylinder whose diameter is slightly less than that of the channel 64. This member 96 comprises a central cylindrical recess 114 in which can fit a cylinder 116 carried by the head 94. The cylinder 116 comprises at its outer surface two series of relief ramps forming a cam 118 a developed view of which is shown in FIGURE 4. The lower ramps form continuous saw-teeth such as 120, whereas the upper ramps form another series of saw-teeth such as 122, forming between them passages such as 124.

The member 96 comprises three studs such as 126 placed at 120° from one another, projecting into the interior of the recess 114; these studs can co-operate with the various ramps of the cam 118, and thus determine the attaching or disengaging positions.

In FIGURE 4 there have been shown the successive relative positions between a stud 126 and the ramps of the cam 118 in the course of an attaching operation and then a detaching operation. It will be apparent that the relative positions of the two other studs relatively to the cam 118 are identical, the latter exhibiting rotation symmetry in its three zones.

If it is assumed that the head 94 is in the position shown in FIGURE 2, that is to say bearing on the shoulder 112 of the aperture 98, attachment is effected in the following way: the member 96 is lowered into the channel 64 by unwinding the cable 26; when contact is made with the upper portion of the cylinder 116, the stud 126 owing to the existence of points such as 128 formed by the upper ramps of the cam 118, enters automatically into one of the passages such as 124; depending on whether it arrives at 126a or 126a' for example, the stud will take the path f or f', but it will be seen that it will in any case abut at 126b between two consecutive lower teeth of the cam 118.

At this moment the cable 26 is slackened; in order to attach the head 94 and then lift it, all that has to be done is to wind the cable 26 on its winch again; the stud in fact passes from 126b to 126c where it comes to abut in a housing in the upper teeth of the cam, and then drive the assembly upwards.

In order to then disengage the head 94, the latter being suspended on the member 96 by the three studs, the stud 126 being at 126c, the winch is unwound and the head 94 is descended until it comes into contact with the shoulder 112. The cam 118 being fixed, the member 96 continues to descend until the stud has passed from 126c to 126d. In this position, it is sufficient to move the cable 26 upwards again to disengage the member 96. The stud passes from 126d to 126e and the head 94 is no longer entrained.

The head 94 and the member 96 comprises respectively at their periphery longitudinal recesses such as 130 and 132 to permit the passage of the refrigerating fluid in all positions through the channel 64.

Another important advantage of the device which is being considered here is that it permits of very simple assembly which greatly facilitates all handling. More particularly, the replacement of an absorbing element which has become worn out can be effected with the same apparatus and the same operations as the replacement of the fuel elements of the reactors; an example of such an operation is given hereinafter: the absorbing element 90 being in the position shown in FIGURES 1a, 1b and 1c, it is first of all descended into its storage container 84. The head 94 then comes to close the aperture 98 of the container as illustrated in FIGURE 2. The handling member 96, which is detached from the head 94 as has just been explained, is then moved upwards successively into the interior of the channel 64, then into the channel 42 of the plug 14, into the channel 40 of the plug 12, and finally is blocked in the housing 38 of the plug 10, which is provided for this purpose. At this instant, it is possible to discharge successively the plug 10 with its winches, cable and handling member, the plug 12, the plug 14, the casing 68, all the casings of the channel 64 and finally the container 84 with its contents. It is then possible to introduce another container 84 comprising a new absorbing element, and to carry out the same operations in the reverse sense to bring the device once more into an operative state. Once the last plug 10 has been positioned, all that has to be done is to lower the member 96 onto the head 94 to obtain the attachment effect desired, and then to move the absorbing element upwards into the desired position in the core. It will be apparent that the replacement of a winch would permit of a still more rapid operation: in fact all that would have to be done in this case would be to move the member 96 upwards again, having first of all relieved it of the head 94, into the housing 38 and then to exchange the plug 10.

Owing to the particularly simple arrangements indicated hereinbefore, there is a reduction in the bulk and length of the absorbing element when it is outside the reactor core, without thereby reducing its effectiveness when it is situated within the core. The other advantages of the proposed device, concerning more particularly the simplification of the necessary biological protection, facility of working and dismantling the driving mechanism and the possibility of complete freeing of the loading face of the reactor, have been brought out clearly from the foregoing description. However, it is to be noted that the proposed manner of use always results in the introduction of the absorbing element in a downward direction within the reactor by engagement of the gripping member connected to the lower end of the cable on the supporting head on which the absorbing chain or chains is/are fixed. If this arrangement then makes it possible to position in the upper portion of the reactor, and more particularly in the biological protection slab, nothing but mechanical elements of small bulk such as the cable winding drum, this means, as has just been seen, that the complete replacement of the entire device and particularly the container containing the chains, requires dismantling of several elements (plugs, casings, detachable container) arranged in succession to one another on either side of the reactor core.

Another arrangement for the storage of the absorbing element can be provided which permits it to be put into position in a downward sense in the core of the reactor and also facilitates the problems of replacing the equipment. For this purpose, this modification, of which FIGURES 5, 6 and 7 illustrate one particular form of embodiment, consists on the one hand in mounting the detachable container containing the absorbing element at the upper portion of its channel and on the other hand of constituting this element by a single chain whose links co-operate with a driving sprocket wheel situated above the container.

As will be seen from FIGURE 5, the entire regulating device is, as in the example shown in FIGURES 1a, 1b and 1c, lodged in a vertical cylindrical orifice 133 extending right through the partition slab 134 separating the reactor core from the garret. Within this orifice there is mounted a metal sheath 136 for guiding and supporting three block elements superposed one above the other and containing the mechanisms of the regulating device.

The first of these elements from the upper end of the orifice 133 is constituted by a plug 138 comprising a lower portion 140 made of concrete contained within a metal envelope 142. The latter also bounds at the upper portion of the plug 138 a chamber 144 within which is arranged an electric motor 146 which drives, by means of an appropriate reduction gear 148, a pinion 150 which itself meshes with a toothed wheel 152. The latter is fixed on a vertical shaft 154 extending axially through the plug 138 at its upper portion. The shaft 154 comprises at its upper end a head 156 adapted to co-operate with a key (not shown) which is operated manually to effect emergency rotational drive. Furthermore, the toothed wheel 152 drives a control gearwheel 158 the axis of which is fast with a selsyn transmitter 160 permitting the control of the position of the shafts 154 in connection with a second transmitter 162. The shaft of the latter supports cams 164 for electrical contactors and is also connected by means of a suitable reduction system 166 to the gearwheel 158. At its lower portion, the plug 138 has a flange 168 with which it comes to bear against a shoulder 170 formed in the inner surface of the sheath 136.

Immediately below the plug 138 there is arranged the second block element or plug 172 which is also provided with a metal envelope 174 bounding within the plug four superposed housings designated respectively by the reference numerals 176, 178, 180 and 182.

In the upper housing 176 there is mounted a mechanical transmission system whereby the rotational movement of the shaft 154 can be communicated to a parallel-arranged connecting shaft 184 by means of two gearwheels 186 and 188 fast respectively with the ends of the shafts 154 and 184. The details of this mechanical transmission will be clearer from FIGURE 7. As will be seen from this figure, indeed, the connection between the shafts 154 and 184 is effected by the sliding of the teeth of their end gearwheels 186 and 188 in the vertical sense. Moreover, a safety system 190 adapted to slide vertically on the shaft 184 under the action of a disengaging lever 192 is subjected to the upward action of a spring 196. The end of the lever 192 bears against an abutment 194 of the upper plug 138, thus permitting controlling the connection between the gearwheels 186 and 188 and the driving of the shaft 184 by the shaft 154 only when this upper plug 138 is in position against the intermediate plug 172. In fact, in the position shown in FIGURE 7, the lever 192 is downwardly repelled by the end of the plug 138 and disengages the dog 191 from the teeth of the gearwheel 188, permitting the latter to pivot about its axis.

It is, however, convenient that the engagement of the two gearwheels 186 and 188 should be brought about only when these two gearwheels are in suitable positions relatively to one another. For this purpose, the gearwheel 186 is mounted slidably on the splines of the shaft 154 with downward pressure from a spring 198 which is compressed in the event of poor positioning on the gearwheel 188 and expands when a slight rotational movement of the two shafts is determined, ensuring the desired engagement. Ball bearings such as 155 and 185 permit the shafts 154 and 184 to pivot without friction for the transmission of movement.

The shaft 184 extending towards the bottom of the plug 172 extends successively through the housing 178 filled with concrete and debouches into the housing 180, terminating in a bevel gearwheel 200 co-operating with a second pinion 202 fast with a wheel 204, whose shaft 206 is journalled in a suitable bore in the plug 172. The housing 182, the shape of which is shown both in FIGURE 5 and in FIGURE 6, constitutes a storage space for a chain 208 constituting the absorbing element and the links of which are driven by the wheel 204 by means of the teeth 210 and recesses provided on the periphery of the said wheel. At one of its ends, the chain is fixed to the bottom of the storage space 182 whilst at its other end terminates in a few solid, heavy links 209. The chain 208 is thus capable of progressively issuing from its storage space 182 to engage in a duct 212 extending obliquely through the lower end of the plug 172. This plug terminates in a bearing surface 214 capable of coming into abutment against a shoulder 216 of the third block element or plug 218.

Like the preceding plugs, this plug 218 is provided with an outer metal envelope 220 filled with concrete, and rests on the base plate 222 fixed to the lower end of the slab 134 against a rim 224 thereof. Axially, the plug 218 is formed with a duct 226 having at its upper portion a flared shape 228 for the guiding of the absorbing chain 208 (FIGURE 6) when the chain issues from the duct 212.

The way in which the regulating device operates in this embodiment described hereinbefore is practically identical to that already explained with reference to the form of embodiment described in connection with FIGURES 1 to 4 with, however, in the present case an introduction of the absorbing element into the core of the reactor in a downward direction and not in an upward direction from the bottom. Moreover, in this embodiment, the group of absorbing chains is replaced by a single chain, which generally means that the latter must be constructed with a more absorbing material than rustless or ordinary steel, for example of a boron or calcium steel.

The arrangements described show clearly that this embodiment retains all the advantages of the first form of the invention, more particularly as regards reducing the bulk of the absorbing element in the position of withdrawal from the reactor, and the easy handling of the said element. However, in the present case easier replacement of the device by another new device in the case of partial damage is permitted, simply extracting the two other block elements 138 and 172, since the third plug 218 can remain permanently in the orifice of the slab to continually ensure partial protection against radiation.

Other changes may be provided for simplifying the kinematic chain of control for the driving wheel, for example grouping the assembly formed by chain and storage space, motor and transmission in a single block element or plug provided at the upper portion of the slab, which also simplifies the problem of possible replacement of the equipment. Similarly, the inclined channel serving for guiding the absorbing chain when it issues from the storage space can be replaced by a vertical duct extending through this space and arranged in alignment with the channel reserved for the unwinding of the chain. In this case, the winding of the chain about this duct in the withdrawn position is effected by driving the winch itself in rotational movement synchronously with the movement of the sprocket wheel.

What we claim is:

1. A device for regulating the power of a nuclear reactor having a biological protecting shield, at least one vertical channel in the reactor core opening through said shield comprising a neutron absorbing element in said channel, at least one deformable metal chain for said element, means for displacing said element within said channel between a "withdrawn" position in which said element is entirely outside the core and a "deployed" position in which said element extends substantially the entire height of the core, a detachable container situated in alignment with said channel receiving said element in "withdrawn" position, at least one removable plug in said shield closing said channel and said displacement means being located within said shield and in said plug.

2. A device as described in claim 1, said container being situated at the lower end of said channel below the reactor core.

3. A device as described in claim 1, said container being arranged above said channel.

4. A device as described in claim 1, said absorbing element comprising a plurality of side-by-side chains, an attaching member connected to an end of said chains and said displacing means including a cable connected to said attaching member.

5. A device as described in claim 1, said displacing means comprising a sprocket wheel and a mechanical driving system for said wheel, said detachable container and said driving system being superimposed in said plugs.

6. A device as described in claim 5, said container and said driving system being located in one of said plugs.

References Cited by the Examiner

FOREIGN PATENTS

| | | |
|---|---|---|
| 1,322,339 | 2/1963 | France. |
| 1,322,620 | 2/1963 | France. |
| 1,347,126 | 11/1963 | France. |
| 583,677 | 10/1958 | Italy. |

LEON D. ROSDOL, *Primary Examiner.*

REUBEN EPSTEIN, CARL D. QUARFORTH,
*Examiners.*

M. R. DINNIN, L. D. RUTLEDGE, *Assistant Examiners.*